May 4, 1937. J. M. CHRISTMAN 2,078,930
MOTOR VEHICLE
Filed March 13, 1933 2 Sheets-Sheet 1
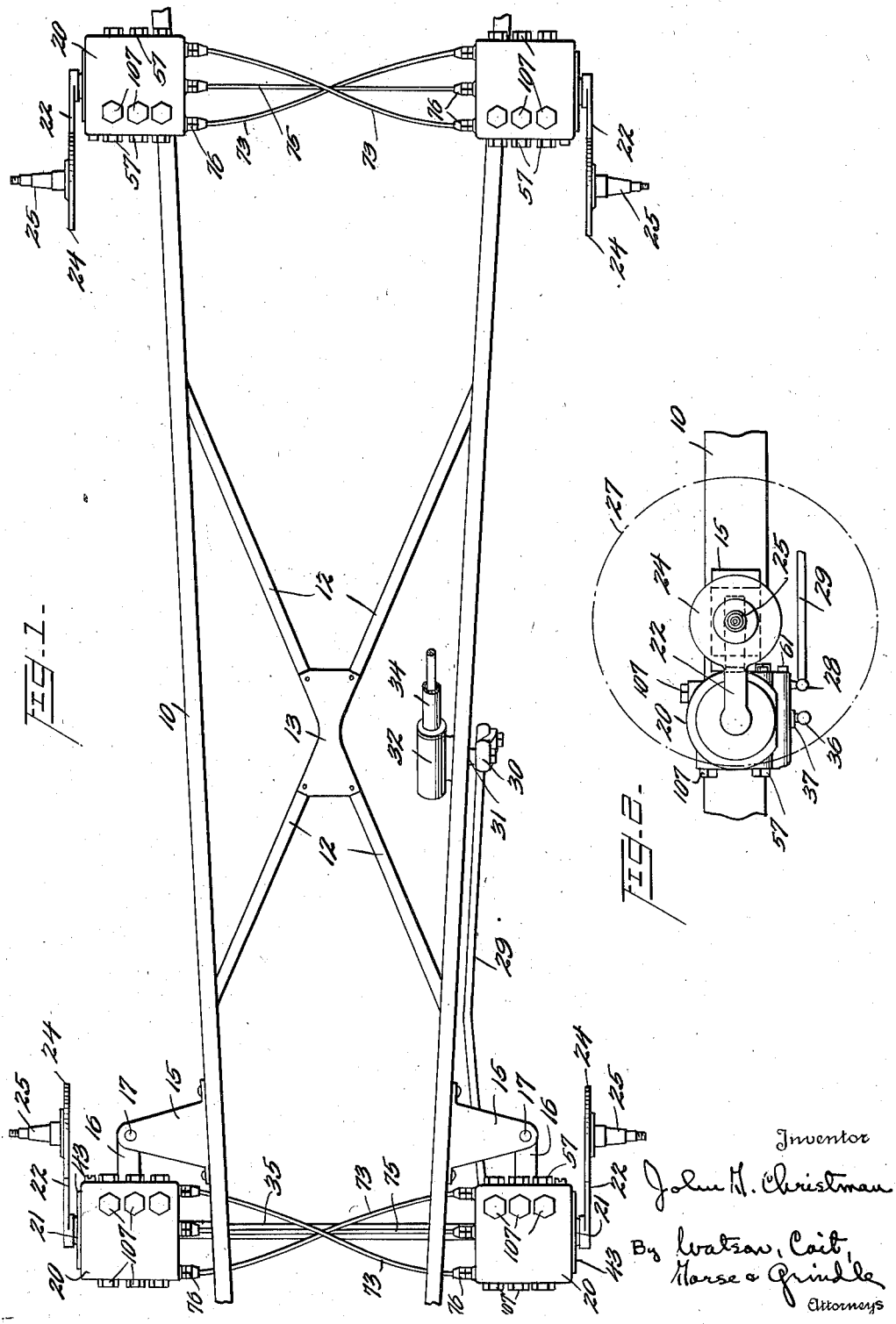

May 4, 1937.  J. M. CHRISTMAN  2,078,930
MOTOR VEHICLE
Filed March 13, 1933  2 Sheets-Sheet 2
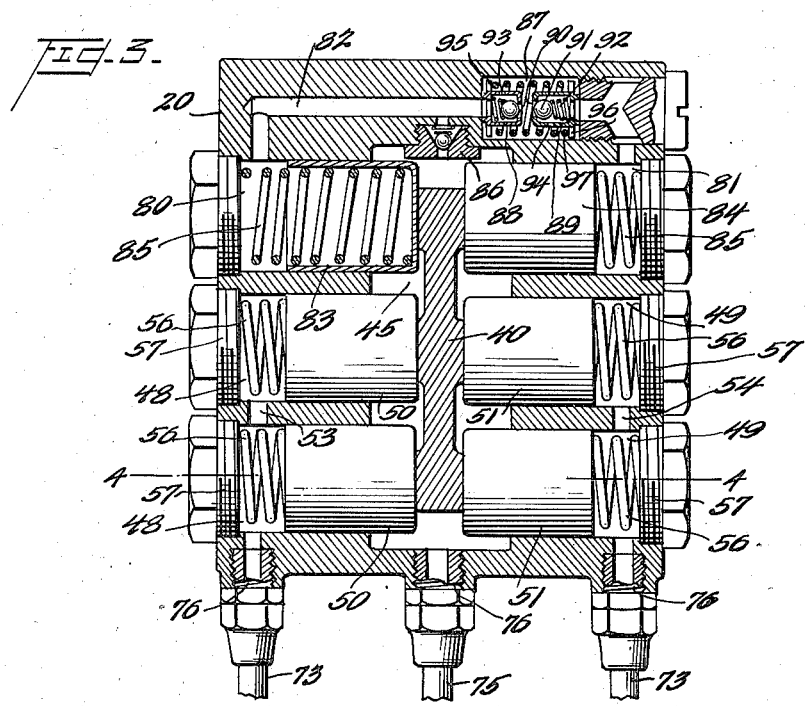
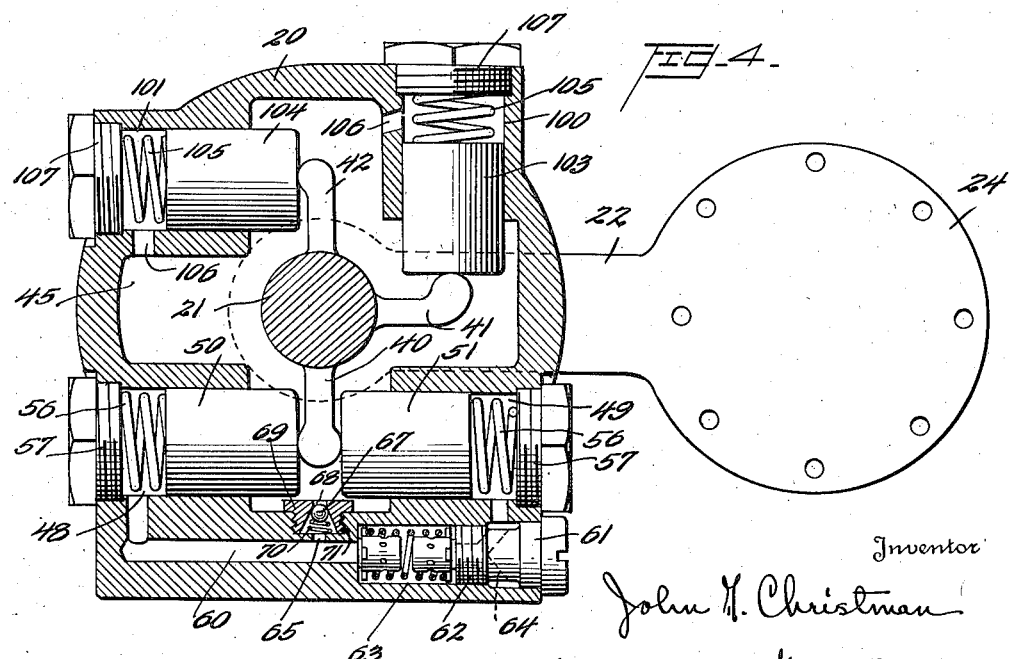
Inventor
John M. Christman
By Watson, Coit, Morse & Grindle
Attorneys Patented May 4, 1937

2,078,930

UNITED STATES PATENT OFFICE 2,078,930

MOTOR VEHICLE

John M. Christman, Detroit, Mich., assignor to Packard Motor Car Company, Detroit, Mich., a corporation of Michigan Application March 13, 1933, Serial No. 660,596

19 Claims. (Cl. 267—11)

This invention relates to motor vehicles and more particularly to improvements in vehicles of the type in which the road wheels are independently sprung. It is the principal object of the invention to provide wheel supporting structure which will improve the riding qualities of the vehicle and in which the road wheels, while independently supported on the vehicle frame, are coordinated to a certain extent to adapt the suspension to varying road conditions.

Thus it is a feature of the invention that the individual support for each wheel comprises not only the yielding means which serves to carry the vehicle load but also embodies shock absorbing structure, each support constituting a compact and readily serviceable unit.

It has been attempted heretofore to apply the principle of cross connection to shock absorbers in general, that is to say, compensating devices have been used to connect shock absorbers at opposite sides of the vehicle in order to obtain a more stable condition of the vehicle frame and body. Thus on turning the vehicle at high speed there is a tendency to compress the springs which afford a support for the outer side of the vehicle with the result that the body tips outwardly and this effect has been overcome to some extent by the cross connection of the shock absorbing devices. It has not, however, proved entirely satisfactory for the reason that an obstruction encountered by the wheel on one side of the vehicle tends to compress the springs on that side, and the cross connection of the shock absorbers then functions to relieve the resistance to compression on the other side of the vehicle, a condition which is obviously undesirable.

It is therefore proposed as part of the present invention to provide an individual wheel suspension employing a plurality of shock absorbers associated with each wheel, certain of these shock absorbers being cross connected with those at the opposite sides of the frame and certain of the shock absorbers acting independently, so that a compromise is effected functioning properly under different conditions of operation of the vehicle.

It is a further object of the invention to provide a combined shock absorber and spring suspension for the steerable road wheels which may be readily supported for swinging steering movement directly on the frame, so that the steering mechanism may be supported by the frame and will thus partake of no relative movement in response to relative vertical movement of the road wheels and frame. It is also an object of the invention to provide a shock absorber and spring suspension which will function in a somewhat different manner on the occurrence of a sudden or violent shock in order to prevent damage to the working parts thereof.

A further object of the invention is the provision in a cross connected shock absorber system of a supply reservoir associated with each shock absorber and means connecting the supply reservoirs at opposite sides of the vehicle to compensate for any difference in the amount of leakage past the pistons of the respective shock absorbers.

Further objects and features of the invention will be apparent from the following description taken in connection with the accompanying drawings, in which Figure 1 is a plan view of a motor vehicle chassis to which the present invention has been applied;

Figure 2 is a partial side elevation showing the manner in which the invention may be applied to a steerable road wheel;

Figure 3 is a substantially horizontal sectional view of a shock absorber and spring suspension device; and Figure 4 is a sectional view on the line 4—4 of Figure 3.

The single embodiment of the invention illustrated in the accompanying drawings is described hereinafter in detail, but it will be understood that specific language is used in order to facilitate an understanding of the invention and that no limitation of the scope of the invention is thereby intended.

Referring to Figure 1 of the drawings, it will be seen that the vehicle frame is represented by the usual side frame members 10 and the X members 12, the latter being secured to the side frame members and provided with a bracing plate 13 at their point of intersection adjacent the center line of the vehicle. The specific construction of the frame is a matter of no importance so far as the present invention is concerned.

Adjacent the forward end of the vehicle, brackets 15 are provided, one of these brackets being secured rigidly to each of the side frame members 10 and serving as a support for the usual steering knuckle 16, a king pin 17 or the equivalent being provided, this king pin being disposed on an axis inclined somewhat with respect to the vertical to provide the usual caster effect.

It will be understood that any conventional practice may be followed in supporting the steering knuckle 16 for swinging movement on the vehicle frame, and that the term "steering knuckle" is intended to apply to any member adapted to carry the vehicle road wheel and supported for movement in a substantially horizontal plane so that the vehicle may be steered by such movement.

In the present construction the steering knuckle 16 extends forwardly as shown in Figure 1 of the drawings and is formed integrally with or is rigidly secured in any convenient manner to a housing 20 which serves to enclose the elements of a shock absorber and also the means for yieldingly supporting the vehicle wheel for substantially vertical movement with respect to the vehicle frame. Thus each housing may serve to support a rotatable shaft 21 extending through the outer wall thereof and having a road wheel carrying arm 22 rigidly secured thereto or formed integrally therewith. The arm 22 carries at its outer end a disk 24 adapted to support the usual brake backing plate, a wheel spindle 25 formed integrally with or rigidly secured to the disk 24, extending laterally from the disk, and being constructed to afford a support for the usual vehicle wheel 27 which is rotatably mounted thereon.

A steering arm 28 rigid with the casing 20 and extending inwardly from the lower side thereof is pivotally connected with the usual drag link 29, the latter being in turn pivotally connected with an arm 30 carried by a shaft 31 extending through the side frame member 10 and communicating with gearing within a steering gear housing 32, the latter being disposed at the lower end of the steering column 34 and being operable from the usual steering hand wheel (not shown).

A cross tie rod 35 is also provided to connect the housings 20 at opposite sides of the vehicle and the knuckles which carry these housings for synchronous steering movement, for instance the rod 35 may be pivotally connected as indicated at 36 to an arm 37 depending from the lower side of each housing 20.

It will be seen from the construction thus far described that on operation of the usual steering hand wheel, both steering knuckles 16, the housings carried thereby, the arms 22, and the steerable road wheel assemblies will be swung in a substantially horizontal plane to steer the vehicle, all of the steering connections being carried directly by the frame and therefore being unaffected when an obstruction is encountered by the wheels.

When an obstruction is encountered by either of the road wheels 27, the road wheel and the wheel carrying arm 22 associated therewith will be swung upwardly about the axis of the shaft 21 which is suitably journalled for rotation in the housing 20, and means are provided for yieldingly resisting this upward movement of the wheel and the consequent rotation of the associated shaft 21. In addition to this yielding means, provision is made for adequately resisting sudden shock and excessive relative accelerative movement of the road wheel and the vehicle frame in a vertical direction.

This arrangement is shown more particularly in Figures 3 and 4 of the drawings, from which it appears that the shaft 21 extends transversely across and within the housing 20 and is provided with one or more arms designated by the reference numerals 40, 41, and 42 respectively. These arms are rigid with the shaft 21 and are preferably formed integrally therewith, the shaft and associated operating elements being initially inserted through an opening in the outer side of the housing 20 which may be provided with a suitable closure member or plate 43 bolted or otherwise secured to the housing, precautions being taken to ensure that the housing shall form a fluid tight enclosure. The shaft 21 and the arms carried thereby operate in a main chamber 45 which constitutes a fluid supply reservoir as hereinafter described. The housing is also formed to provide in the lower portion thereof oppositely disposed cylinders 48 and 49 which preferably extend substantially horizontally, pistons designated at 50 and 51 operating in the respective cylinders. In the drawings, two cylinders 48 and two cylinders 49 are shown, but the number of cylinders employed may be varied, similar reference numerals being used since the cylinders in question perform similar functions. Thus the cylinders 48 are placed in direct communication by means of a passage 53 through the common wall of these cylinders and similarly the cylinders 49 are placed in communication by a passage 54. The inner ends of the pistons 50 and 51 are in abutting relation with the arm 40 so that the pistons may be reciprocated when the shaft 21 is rocked in response to vertical movement of the associated road wheel with respect to the vehicle frame. It will be observed that the chamber 45 serves in effect as a crank case, any leakage of oil past the pistons from the cylinders 48 and 49 discharging into the chamber 45. A coil spring 56 is located within each of the cylinders 48 and 49 and is compressed between the piston and the element 57 which is threaded into and serves as a closure member for the outer end of each cylinder, the pistons being preferably hollow and receiving the coil springs therein.

The cylinders 48 and 49 are placed in restricted communication by means of a duct or passage 60 which may be formed in the wall of the housing 20. One end of the passage 60 is closed by means of a plug 61 which is threaded as at 62 within an enlarged portion 63 of the passage, the latter serving as a valve chamber. The plug 61 is drilled as indicated at 64 to permit fluid to pass through the passage 60 between the cylinders 48 and 49.

The valve elements within the chamber 63 which will be described more in detail hereinafter, are constructed so as to restrict the movement of fluid through the passage 60 from one cylinder to another for resisting rocking of the shaft 21. Thus when an obstruction is encountered by the road wheel, the arm 22 and the shaft 21 are rocked in a counterclockwise direction displacing the arm 40 to the right as viewed in Figure 4 and forcing fluid through the passage 60 from the cylinder 49 into the cylinder 48. When the road wheel again moves downwardly the reverse of this operation takes place, the fluid being forced from the cylinder 48 into the cylinder 49. It is thus convenient to describe the cylinders 49 which function to resist sudden upward movement of the wheel as compression cylinders and the cylinders 48 which function to resist sudden downward movement of the wheel as rebound cylinders.

Means are provided to permit the introduction of fluid into the system comprising the cylinders 48 and 49 from the chamber 45 so that the chamber may function as a supply reservoir. This means may consist of an aperture 65 in the wall defining the passage 60, and a one-way valve associated with that aperture to prevent return of fluid from the passage 60 to the chamber 45. For instance, the valve may comprise a movable element 67 yieldingly retained in seating position on an aperture 68 in a plug 69 by means of a coil spring 70, the plug being threaded in position as indicated at 71. Thus if the supply of fluid in the cylinders 48 and 49 becomes depleted as the result of leakage past the pistons, the operation of the pistons and the resulting partial vacuum produced will serve to withdraw fluid from the chamber 45 past the valve element 67 and the aperture 65 so that the fluid is automatically replenished.

The compression cylinders 49 at each side of the vehicle are placed in open communication with the rebound cylinders 48 at the opposite side of the vehicle by means of conduits 73 and the chambers 45 in the housings 20 at opposite sides of the vehicle are also placed in open communication by means of a conduit 75 extending therebetween. The conduits 73 and 75 are provided with suitable conventional fittings 76 which are threaded into the housings 20 at either end of the conduits, and these fittings need not be described in detail. It will be noted, however, that since the housings 20 partake of relative vertical movement during operation of the vehicle, and also partake of simultaneous swinging movement during steering of the vehicle, at least those portions of the conduits 73 and 75 which lie adjacent the housings must be flexible, the flexible portions being of sufficient length to permit the necessary movement. If desired the portions of the conduits 73 and 75 lying between the side frame members 10 may be rigid and rigidly secured to the side frame members.

It will be apparent from the construction thus far described that side sway of the vehicle on rounding a curve at high speed is materially reduced since the actuation of the pistons in the compression cylinders associated with the outer vehicle wheel will result in flow of fluid through the associated conduit 73 and will thus supply fluid under compression to the rebound cylinders at the inner side of the vehicle, so that the frame at the inner side of the vehicle tends to drop with respect to the road wheels simultaneously with lowering of the frame at the outer side of the vehicle, and the frame is thus supported in a substantially horizontal position.

The conduit 75 connecting the chambers 45 in the housings 20 on opposite sides of the vehicle frame serves to obviate the difficulty hereinbefore encountered as the result of cross connection of shock absorbers when the leakage past the pistons in one shock absorber is greater than that in the other. It will be appreciated that this difference in operating conditions within the two shock absorbers, which is quite likely to arise, results in effect in pumping the oil out of one supply reservoir and into the other supply reservoir, the fluid being drawn more rapidly from that supply reservoir in which the pistons are leaking to a less extent. Persistence of this condition obviously results in impairing the uniform action of the two shock absorbing devices, but the difficulty is overcome by the provision of the conduit 75 which serves to equalize the pressures and fluid levels in the connected chambers 45.

Owing to the fact that the tendency toward synchronous action of the road wheels effected by cross connection of the shock absorbers is undesirable under certain conditions as hereinbefore mentioned, separate shock absorbing devices are preferably associated with each of the road wheels which function independently and act merely to resist relative movement of the associated vehicle wheel and frame. Thus separate shock absorbers may be formed within the housings 20 and are shown as comprising cylinders 80 and 81, pistons 83 and 84 being operable in the respective cylinders by the arm 40 which they abut. The construction may be similar to that described in connection with the cylinders 48 and 49, coil springs 85 being provided to assist in supporting the vehicle load and to maintain the pistons in abutting relation with the arm 40.

The cylinders 80 and 81 are connected by a passage 82, the latter being provided with a one-way connection 86 with the chamber 45 and being provided with a valve chamber 87. Since this construction is identical with that described with reference to cylinders 48 and 49 it need not be dealt with specifically.

Referring now to the valves which are located in the valve chambers 63 and 87 and which are shown as identical, it will be observed that two substantially cup shaped valve elements 88 and 89 are provided, each of these elements being formed at its inner end with an opening 90 normally closed by a member 91 yieldingly seated by means of a coil spring 92. The elements 88 and 89 are provided with restricted orifices 93 and 94 to permit passage of fluid therethrough and are also provided with flanged portions 95 and 96 which serve as abutments for a relatively stiff coil spring 97, the latter serving to retain the elements 88 and 89 in position in engagement with the end walls of the valve chamber. The flanged portions 95 and 96 of the valve elements also serve as guides for the valve elements and are preferably interrupted to provide passages for fluid about a considerable portion of the circumference thereof.

Each of the valve elements 88 and 89 are normally seated at the opposite ends of the valve chambers by the action of the coil spring 97 so that fluid moving from the compression cylinders to the rebound cylinders is forced to pass through the orifice 94 in the valve element 89 and fluid moving from the rebound cylinders to the compression cylinders flows through the orifice 93 in the valve element 88, the members 91 yielding in one direction to permit the flow of fluid thereby so that the orifices 93 and 94 may be of different size and will not function in series. This is desirable since it is obvious that the conditions of operation of the pistons within the rebound and within the compression cylinders are different and as a general rule less resistance should be offered to the flow of fluid from the compression cylinders.

It will be seen that when excessive vertical acceleration of a vehicle road wheel occurs, pressures may be developed within the compression cylinders which will reach dangerous proportions and which may cause the pistons to seize by the expansive force applied thereto. In order to relieve such excessive and unusual pressures, the valve element 89 is permitted to move from its seat at the associated end of the valve chamber and thus allow passage of fluid through the interrupted flange portion 96, the coil spring 97 being sufficiently strong to resist this movement except in response to abnormally high pressure. While the same movement may be imparted to the valve elements 88 on the development of abnormal pressure in the rebound cylinders, such pressures are seldom or never developed in practice.

It is an important feature of the invention that those pistons which are fluid controlled are arranged in the lower portion of the housing 20 and are disposed with their axes substantially horizontal so that there is no possibility that air pockets will be formed. Furthermore, the fluid cylinders and the valve element 67 which controls the supply of fluid to the operating system will function properly even though the supply of fluid within the chamber 45 is nearly depleted, by reason of the fact that these elements are located at the lowest portion of the chamber.

In order that adequate provision may be made for yieldingly supporting the load of the vehicle, additional springs are provided in the upper portion of the housing 20. Thus this portion of the housing may be formed with cylinders 100 and 101 having pistons 103 and 104 respectively operating therein. The pistons 103 abut and are operated by the arms 41 and pistons 104 are engaged by the arms 42 on the shaft 21.

Coil springs 105 are provided in these cylinders and it will be observed that six cylinders are shown in the drawings, three of these extending substantially vertically and three being disposed generally horizontally. These cylinders are preferably not included in the hydraulic system and act merely to yieldingly support the vehicle. For this purpose passages 106 are provided to place each of the cylinders 100 and 101 in open communication with the chamber 45 so that the pressure within the cylinders is the same as that in the chamber. The outer end of each of these cylinders is closed by means of a threaded element 107.

It will be observed that the shock absorber and spring suspension construction as shown more particularly in Figures 3 and 4 of the drawings comprises a compact and readily serviceable unit in which adequate provision is made for springing the vehicle wheels and absorbing sudden shock. It will be understood, however, that while the preferred construction has been shown, the principle of cross connection described hereinbefore is equally applicable to other types of spring suspension and shock absorbers.

In applying the invention to the road wheels at the rear of the vehicle, the usual steering knuckle is of course eliminated and the shock absorbing and spring suspension housing 20 may be bolted or otherwise rigidly secured directly on the side frame members of the vehicle. These shock absorbing devices may be identical with those hereinbefore described and the only change required is the provision of a suitable axial passage through the rear wheel spindles to permit the connection of the usual transversely extending drive shafts to the vehicle wheels. The manner in which this connection is effected may be conventional and the details thereof form no part of the present invention. It may be noted, however, that the construction permits the mounting of the usual differential gear housing directly on the frame, a universal shafting extending laterally from this housing to each of the rear road wheels.

Having thus described the invention, what is claimed as new and desired to be secured by Letters Patent is:

1. In a motor vehicle, the combination with a vehicle frame, of a pair of road wheels disposed at opposite sides and adjacent one end of the frame, means for yieldingly and independently supporting said wheels for substantially vertical movement with respect to the frame and to each other, shock absorbing devices, one allocated to each of said road wheels and acting between the frame and the wheel to resist sudden relative vertical movement thereof, and a connection between said devices operable on movement of one of said road wheels for reducing the degree of resistance offered by the device associated with the other road wheel to movement of the latter in the same direction.

2. In a motor vehicle, the combination with a vehicle frame, of a pair of road wheels disposed at opposite sides and adjacent one end of the frame, means for yieldingly and independently supporting said wheels for substantially vertical movement with respect to the frame and to each other, shock absorbing devices, one allocated to each of said road wheels and acting between the frame and the wheel to resist sudden relative vertical movement thereof, a connection between said devices operable on movement of one of said road wheels for reducing the degree of resistance offered by the device associated with the other road wheel to movement of the latter in the same direction, and additional shock absorbing devices, one allocated to each of said wheels and functioning independently of each other, for resisting sudden relative movement of the associated wheel and the vehicle frame.

3. In a motor vehicle, the combination with a vehicle frame, of a pair of road wheels disposed at opposite sides and adjacent one end of the frame, means for yieldingly and independently supporting said wheels for substantially vertical movement with respect to the frame and to each other, shock absorbing devices, one allocated to each of said road wheels and acting between the frame and the wheel to resist sudden relative vertical movement thereof, a connection between said devices operable on movement of one of said road wheels for reducing the degree of resistance offered by the device associated with the other road wheel to movement of the latter in the same direction, and means associated with each of said devices and operable in response to excessive relative accelerative movement of said vehicle wheel and frame for momentarily reducing the resistance offered to such movement by the said device.

4. In a motor vehicle, the combination with a vehicle frame, of a pair of road wheels disposed at opposite sides and adjacent one end of the frame, means for yieldingly and independently supporting said wheels for substantially vertical movement with respect to the frame and to each other, fluid pressure shock absorbing devices, one allocated to each of said road wheels and acting between the frame and the wheel to resist sudden relative vertical movement thereof, and a fluid connection between said devices operable on movement of one of said road wheels for reducing the degree of resistance offered by the device associated with the other road wheel to movement of the latter in the same direction.

5. In a motor vehicle, the combination with a vehicle frame, of a pair of road wheels disposed at opposite sides and adjacent one end of the frame, means for yieldingly and independently supporting said wheels for substantially vertical movement with respect to the frame and to each other, fluid pressure shock absorbing devices, one allocated to each of said road wheels and acting between the frame and the wheel to resist sudden relative vertical movement thereof, a fluid connection between said devices operable on movement of one of said road wheels for reducing the degree of resistance offered by the device associated with the other road wheel to movement of the latter in the same direction, and means associated with each of said devices and operable in response to excessive relative accelerative movement of said vehicle wheel and frame for momentarily relieving the pressure developed therein.

6. In a motor vehicle, the combination with a vehicle frame, of a pair of road wheels disposed at opposite sides and adjacent one end of the frame, means for yieldingly and independently supporting said wheels for substantially vertical movement with respect to the frame and to each other, shock absorbing devices, one allocated to each of said road wheels and acting between the frame and the wheel to resist sudden relative vertical movement thereof, each of said shock absorbing devices comprising a pair of fluid chambers, fluid passages affording communication between one chamber of each pair with one chamber of the other pair, and means operable on relative vertical movement of said wheels for forcing fluid from one chamber of each pair through the associated passage into the communicating chamber.

7. In a motor vehicle, the combination with a vehicle frame, of a pair of road wheels disposed at opposite sides and adjacent one end of the frame, means for yieldingly and independently supporting said wheels for substantially vertical movement with respect to the frame and to each other, shock absorbing devices, one allocated to each of said road wheels and acting between the frame and the wheel to resist sudden relative vertical movement thereof, each of said shock absorbing devices comprising a pair of fluid chambers, fluid passages affording communication between one chamber of each pair with one chamber of the other pair, means operable on relative vertical movement of said wheels for forcing fluid from one chamber of each pair through the associated passage into the communicating chamber, ducts affording restricted communication between the chambers of each pair, and a relief valve associated with said ducts and operable in response to excessive accelerative movement to afford a by-pass for fluid to relieve the pressure developed in said chambers.

8. In a motor vehicle, the combination with a vehicle frame, of a pair of road wheels disposed at opposite sides and adjacent one end of the frame, means for yieldingly and independently supporting said wheels for substantially vertical movement with respect to the frame and to each other, shock absorbing devices, one allocated to each of said road wheels and acting between the frame and the wheel to resist sudden relative vertical movement thereof, each of said shock absorbing devices comprising a pair of fluid chambers, fluid passages affording communication between one chamber of each pair with one chamber of the other pair, means operable on relative vertical movement of said wheels for forcing fluid from one chamber of each pair through the associated passage into the communicating chamber, ducts affording restricted communication between the chambers of each pair, means normally restricting the flow of fluid through said ducts, said means being movable in response to excessive fluid pressure to reduce the degree of restriction of flow in said ducts.

9. In a motor vehicle, the combination with a vehicle frame, of a pair of road wheels disposed at opposite sides and adjacent one end of the frame, means for yieldingly and independently supporting said wheels for substantially vertical movement with respect to the frame and to each other, and a shock absorbing system associated with said wheels and said frame to resist such relative movement, said system including pairs of shock absorbers, one pair being allocated to each wheel, one absorber of each pair functioning independently to resist movement of the associated wheel, and the other absorbers of each pair being operably connected.

10. In a motor vehicle, the combination with a vehicle frame, of a pair of road wheels disposed at opposite sides and adjacent one end of the frame, means for yieldingly and independently supporting said wheels for substantially vertical movement with respect to the frame and to each other, and a shock absorbing system associated with said wheels and said frame to resist such relative movement, said system including pairs of shock absorbers, one pair being allocated to each wheel, one absorber of each pair functioning independently to resist movement of the associated wheel, and the other absorbers of each pair being operably connected, the connections comprising means offering greater resistance to non-synchronous movement of the wheels than to synchronous movement of the wheels.

11. In a motor vehicle, the combination with a vehicle frame, of a pair of road wheels disposed at opposite sides and adjacent one end of the frame, means for yieldingly and independently supporting said wheels for substantially vertical movement with respect to the frame and to each other, and a shock absorbing system associated with said wheels and said frame to resist such relative movement, said system including pairs of shock absorbers, one pair being allocated to each wheel, one absorber of each pair functioning independently to resist movement of the associated wheel, and means connecting the other shock absorbers of each pair and acting thereon to increase the resistance of the absorbers to non-synchronous movement of the wheels.

12. In a motor vehicle, the combination with a vehicle frame, of a pair of road wheels disposed at opposite sides and adjacent one end of the frame, means for yieldingly and independently supporting said wheels for substantially vertical movement with respect to the frame and to each other, fluid pressure shock absorbing devices, one allocated to each of said road wheels and acting between the frame and the wheel to resist sudden relative vertical movement thereof, a fluid connection between said devices operable on movement of one of said road wheels for reducing the degree of resistance offered by the device associated with the other road wheel to movement of the latter in the same direction, a fluid reservoir associated with each shock absorber, and means affording communication between said reservoirs.

13. In a motor vehicle, the combination with a vehicle frame, of road wheels disposed at opposite sides and adjacent one end of the frame, means for yieldingly supporting said road wheels for substantially vertical movement with respect to said frame, and means resisting such vertical movement, said means comprising a shock absorbing device acting between each road wheel and the frame, each device including fluid pressure chambers, piston means operable in said chambers, a supply reservoir receiving fluid leaking past said pistons, and means including a one-way valve affording communication between said supply reservoir and said chambers to automatically replenish the fluid in the latter, passages connecting each chamber of one device with the reversely functioning chamber of the other device, and a passage affording communication between said supply reservoirs.

14. In a motor vehicle, the combination with a vehicle frame, of road wheels disposed at opposite sides and adjacent one end of the frame, means for yieldingly supporting said road wheels for substantially vertical movement with respect to said frame, and means resisting such vertical movement, said means comprising a shock absorbing device acting between each road wheel and the frame, each device including a supply reservoir constituting a crank case, a pair of cylinders leading from said crank case, pistons operable in said cylinders, means in said crank case for operating said pistons, and means affording restricted communication between said cylinders, said pistons functioning respectively on compression and rebound to force fluid from the associated chambers, connections between each chamber of one device with the reversely functioning chambers in the other device, and a passage affording communication between said supply reservoirs.

15. In a spring suspension and shock absorber for motor vehicles, the combination with a housing provided with a pair of aligned cylinders in the lower portion thereof, said cylinders having substantially horizontal axes, of a chamber comprising a fluid supply reservoir in communication with the open ends of said cylinders and extending above the latter, a fluid passage connecting the closed ends of said cylinders, pistons operable in said cylinders, actuating means for said pistons within said chamber, yielding means for resisting movement of said pistons in one direction, said yielding means comprising springs disposed within said cylinders and engaging said pistons, and additional springs located within said housing and operatively connected with said actuating means.

16. In a spring suspension and shock absorber for motor vehicles, the combination with a housing provided with a pair of aligned cylinders in the lower portion thereof, said cylinders having substantially horizontal axes, of a chamber comprising a fluid supply reservoir in communication with the open ends of said cylinders and extending above the latter, pistons operable in said cylinders, actuating means for said pistons within said chamber, yielding means for resisting movement of said pistons in one direction, and means affording communication between said chamber and said cylinders, said means comprising a fluid passage connecting said cylinders, and a one-way valve associated with said passage for admitting fluid to said cylinders.

17. In a spring suspension and shock absorber for motor vehicles, the combination with a housing provided with a pair of aligned cylinders in the lower portion thereof, said cylinders having substantially horizontal axes, of a chamber comprising a fluid supply reservoir in communication with the open ends of said cylinders and extending above the latter, a fluid passage connecting the closed ends of said cylinders, pistons operable in said cylinders, actuating means for said pistons within said chamber, yielding means for resisting movement of said pistons in one direction, and springs located within the upper portion of said housing and associated with said actuating means to resist movement of the latter.

18. In a motor vehicle, the combination with a vehicle frame, of a steering knuckle carried by said frame, a steerable road wheel, and means yieldingly supporting said road wheel for movement in a substantially vertical plane, said means comprising a housing carried by said knuckle, a wheel carrying device supported for vertical movement with respect to said housing and including a member extending within the latter, the lower portion of said housing being formed to provide a pair of opposed cylinders having a common, substantially horizontal axis, pistons in said cylinders operable by said member, means affording direct but restricted communication between said cylinders, and springs in said cylinders operable by said pistons.

19. In a spring suspension and shock absorber for motor vehicles, the combination with a housing provided with a pair of aligned cylinders in the lower portion thereof, said cylinders having substantially horizontal axes, a restricted fluid passage connecting said cylinders, pistons operable in said cylinders for forcing fluid through said passage, additional cylinders within said housing and disposed above said first named cylinders, springs in said additional cylinders, pistons for compressing said springs, actuating means for all of said pistons, and means for supplying fluid to said first named cylinders only.

JOHN M. CHRISTMAN.